Patented Sept. 22, 1936

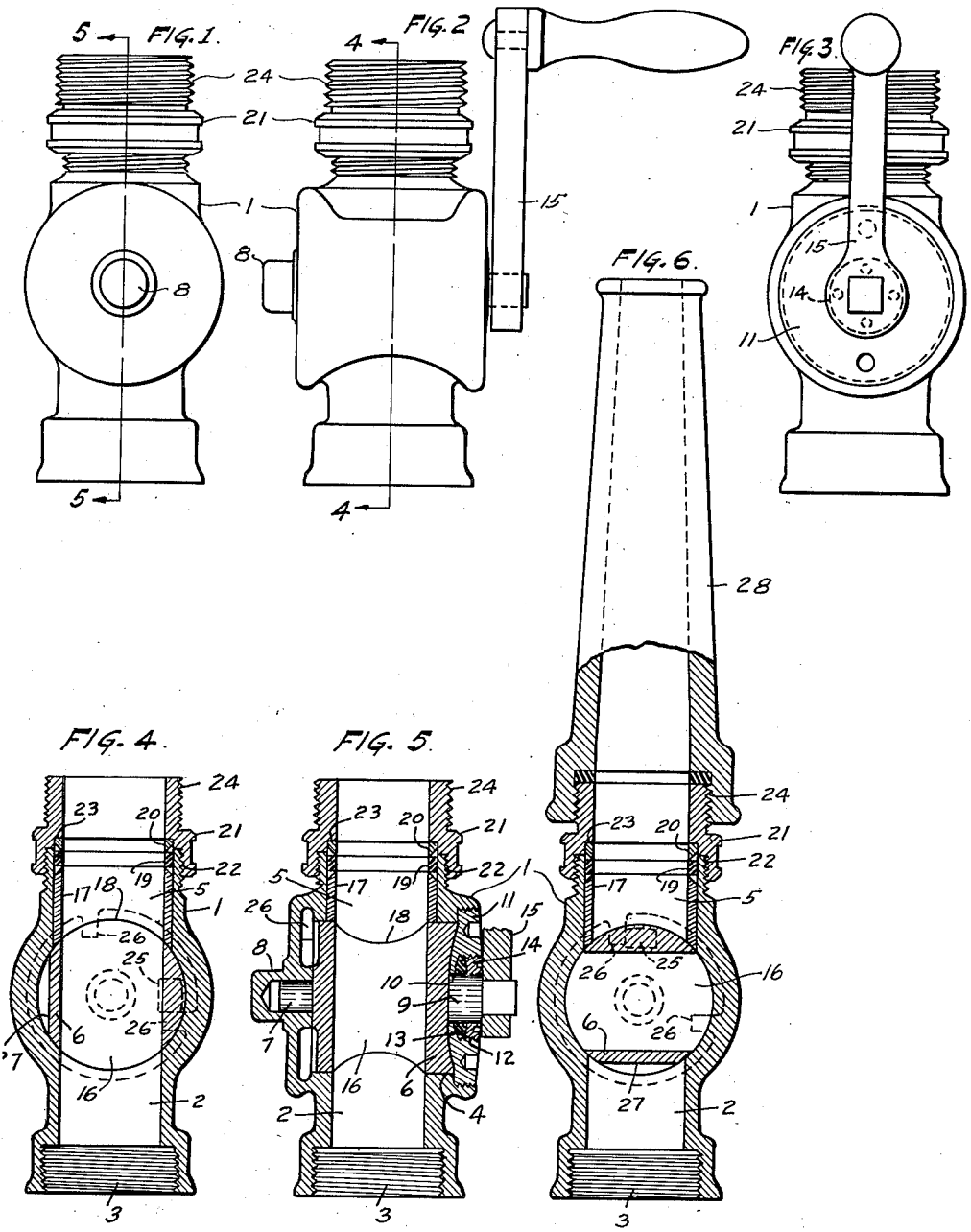

2,055,232

UNITED STATES PATENT OFFICE 2,055,232

VALVE

Clarence L. Hardy and Robert C. Anderson, Dayton, Ohio, assignors to Buckeye Iron and Brass Works, Dayton, Ohio, a corporation of Ohio Application April 26, 1934, Serial No. 722,598

2 Claims. (Cl. 251—113)

This invention relates to improvements in valves, and has for its object to provide a nonleak valve adapted to be used for various purposes, but particularly well adapted for use on water hose in connection with fire engines.

It is an object of this invention to provide, in connection with a valve casing, an adapter by which various nozzles may be attached to the valve casing.

It is an object of the invention to provide, in connection with a valve casing, a rotor and a sleeve cooperating with the rotor and the casing to form a watertight fit, whereby leakage is prevented.

These and other objects and advantages will appear from the following description taken in connection with the drawing.

Referring to the drawing:

Figure 1 is a side elevation of the valve casing.

Figure 2 is a view taken from the righthand side of Figure 1.

Figure 3 is a view taken from the righthand side of Figure 2.

Figure 4 is a section on the line 4—4 of Figure 2.

Figure 5 is a section on the line 5—5 of Figure 1, showing the valve rotor in open position.

Figure 6 is a section similar to Figure 5 but with the rotor in closed position.

The valve structure consists of three parts, a casing, a rotor and an adapter. The casing 1 has a passageway through it forming an inlet 2 having threads 3 therein, a cylindrical chamber 4 and an outlet 5. In the cylindrical chamber, which is open at one end and closed at the other, there is a rotor 6 which has on one end a trunnion 7 rotatably supported in a bearing 8 formed in the closed end of the cylindrical chamber. On the other end of the rotor is a trunnion 9, which extends through a hole 10 formed in the central part of a circular disc 11 threaded into the open end of the cylindrical chamber.

The hole 10 is enlarged on the outer face of the disc 11, as indicated by the numeral 12, and has therein a packing 13 held in place around the trunnion 9 by means of a threaded washer 14. The outer end of the trunnion 9 is squared to receive one end of a handle 15 by which the rotor is shifted for opening and closing the passageway through the valve casing. The rotor has through it a passageway 16 adapted to align with the passageway through the casing when the rotor is in one position.

Fitting within the outlet part 5 of the passageway is a sleeve 17. In order to receive this sleeve the part of the casing around the outlet 5 is slightly enlarged so that when this sleeve is positioned the passageway through it is in line with the inlet passageway 2 and of the same dimension. The inner end of the sleeve is arcuate to fit the periphery of the cylindrical rotor, as indicated by the numeral 18. Against the end of the sleeve remote from the rotor there is an annular gasket 19, which is yielding and resilient in nature and held against the end of the sleeve by means of a ring or washer 20.

Fitting over the part of the casing around the outlet part of the passageway is an adapter 21, which is threaded at 22 on the casing and provided with a shoulder 23 to engage the ring 20 to force the ring against the gasket 19 so there is a watertight seal formed between the adapter and the sleeve.

The gasket being resilient in nature tends to urge the sleeve against the rotor so that at the points where the sleeve engages the rotor there is a watertight fit. This engagement between the sleeve and the rotor will cause the rotor also to closely fit the side of the cylindrical chamber opposite the sleeve. The outer end of the adapter is threaded at 24 to receive a nozzle 28. Since nozzles vary in size this part of the adapter may be varied. That is, adapters may be made in different sizes, each adapted to be threaded onto the casing but having a threaded end 24 to suit the nozzle which it is to receive.

This adapter may be made and provided in large numbers, varying in size. If a fire truck belonging to one community should be used in fighting fires in another community and it would be necessary to apply to the hose a nozzle of different dimension, the necessary adapter may be used. If the nozzle is large an adapter with a larger threaded end may be used. If the nozzle is smaller an adapter with a smaller threaded end may be used.

For the purpose of limiting the rotation of the rotor there is provided on the rotor a stop 25 adapted to engage with one of two stops 26 located on the casing at the closed end of the cylindrical chamber. These stops are positioned so that when the stop 25 engages one of the stops 26 a passageway is provided through the casing and the rotor. When the stop 25 engages the other of the stops 26 the passageway is cut off. That part of the rotor adjacent the inlet end of the passageway when the rotor is in closed position is flat, as indicated by the numeral 27, to provide a flat surface against which the pressure bears when the water is shut off.

We desire to comprehend within our invention such modifications as may be embraced within our claims and the scope of our invention.

Having thus fully described our invention, what we claim as new and desire to secure by Letters Patent, is:

1. In a valve structure, a casing having a passageway therein, a rotor in the casing to open and close the passageway, a nozzle adapter having one end threaded to engage the casing around the passageway and its other end threaded to receive a nozzle, and a sleeve in the passageway having one of its ends shaped to fit the rotor, said adapter having a plurality of internal stepped portions defined by bores of different diameters, one of said bores comprising said first mentioned threaded end, and resilient means having one of its ends bearing against one of said stepped portions and slidable in a second bore and its other end abutting against the other end of said sleeve, the internal diameters of said rotor, sleeve, and a third bore of the adapter being substantially equal whereby to define a substantially uninterrupted passageway through the valve.

2. In combination, a valve casing having a passageway therein, a rotor to open and close the passageway, a sleeve in the passageway, one end of the sleeve being formed to fit the rotor, a nozzle adapter attached at one end to the casing about the passageway and having its other end formed to receive a nozzle, and means operated by the adapter to force the sleeve against the rotor, said means comprising a resilient gasket, said adapter having two internal stepped portions defined by three bores of different diameters, the largest diametered bore being screw-threaded for attachment to said casing, the intermediate bore forming a recess for the reception of said gasket and the diameter of the smallest bore being the same as the internal diameter of said sleeve, the external diameter of said gasket and sleeve being substantially the same as the internal diameter of said passageway to allow sliding movement therein of said sleeve and gasket, whereby to effect simultaneously the attachment of the adapter and tightening of the seal between the sleeve and the rotor.

CLARENCE L. HARDY.
ROBERT C. ANDERSON.